United States Patent
Takahashi et al.

(10) Patent No.: US 8,817,191 B2
(45) Date of Patent: Aug. 26, 2014

(54) IMAGE PROCESSING APPARATUS AND IMAGE PROCESSING METHOD

(71) Applicant: Kabushiki Kaisha Toshiba, Tokyo (JP)

(72) Inventors: Yukie Takahashi, Kunitachi (JP); Kei Imada, Hamura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/975,987

(22) Filed: Aug. 26, 2013

(65) Prior Publication Data

US 2014/0063350 A1 Mar. 6, 2014

Related U.S. Application Data

(63) Continuation of application No. PCT/JP2013/060405, filed on Mar. 29, 2013.

(30) Foreign Application Priority Data

Aug. 29, 2012 (JP) ................................ 2012-189275

(51) Int. Cl.
H04N 9/74 (2006.01)

(52) U.S. Cl.
USPC ........................................................ 348/581

(58) Field of Classification Search
USPC .......... 348/581, 606, 625; 345/428, 419, 630; 382/255, 305; 396/89, 128
See application file for complete search history.

(56) References Cited

U.S. PATENT DOCUMENTS

| | | | | |
|---|---|---|---|---|
| 5,323,204 A | * | 6/1994 | Wheeler et al. | 396/60 |
| 5,621,495 A | * | 4/1997 | Yamamoto et al. | 396/89 |
| 7,068,275 B2 | * | 6/2006 | Nakamura et al. | 345/428 |
| 7,844,176 B2 | * | 11/2010 | Kunishige et al. | 396/128 |
| 8,265,429 B2 | * | 9/2012 | Sagawa | 382/305 |
| 8,319,898 B2 | * | 11/2012 | Ueno et al. | 348/625 |
| 8,368,796 B2 | * | 2/2013 | Honjo et al. | 348/333.05 |
| 8,462,266 B2 | | 6/2013 | Ueno et al. | |
| 8,493,383 B1 | * | 7/2013 | Cook et al. | 345/419 |

(Continued)

FOREIGN PATENT DOCUMENTS

| | | |
|---|---|---|
| JP | 2748378 | 2/1998 |
| JP | 2009-042482 | 2/2009 |
| JP | 2009-104284 | 5/2009 |

(Continued)

OTHER PUBLICATIONS

International Search Report and Written Opinion from corresponding PCT/JP2013/060405 mailed Jun. 4, 2013.

*Primary Examiner* — Paulos M Natnael
(74) *Attorney, Agent, or Firm* — Blakely, Sokoloff, Taylor & Zafman LLP

(57) ABSTRACT

According to one embodiment, an image processing apparatus includes: an enlarged-image generation module configured to generate enlarged image information that is enlarged with a predetermined magnification ratio from input image information; a depth characteristic calculator configured to calculate, from the input image information, a depth characteristic amount indicating a change level of depth of field for each a plurality of areas comprised in the input image information; and a generation module configured to compose image information comprising a predetermined high-frequency component onto the enlarged image information, based on the depth characteristic amount calculated by the depth characteristic calculator to generate output image information.

18 Claims, 9 Drawing Sheets

(56) References Cited

U.S. PATENT DOCUMENTS

| | | |
|---|---|---|
| 2009/0040376 A1 | 2/2009 | Kobayashi |
| 2009/0103621 A1 | 4/2009 | Numata et al. |
| 2010/0226577 A1 | 9/2010 | Saito et al. |
| 2011/0129165 A1* | 6/2011 | Lim et al. .................. 382/255 |
| 2012/0050322 A1* | 3/2012 | Sato ............................ 345/630 |
| 2012/0133826 A1 | 5/2012 | Takahashi |

FOREIGN PATENT DOCUMENTS

| | | |
|---|---|---|
| JP | 2010-211300 | 9/2010 |
| JP | 2011-120270 | 6/2011 |
| JP | 2012-118752 | 6/2012 |

* cited by examiner

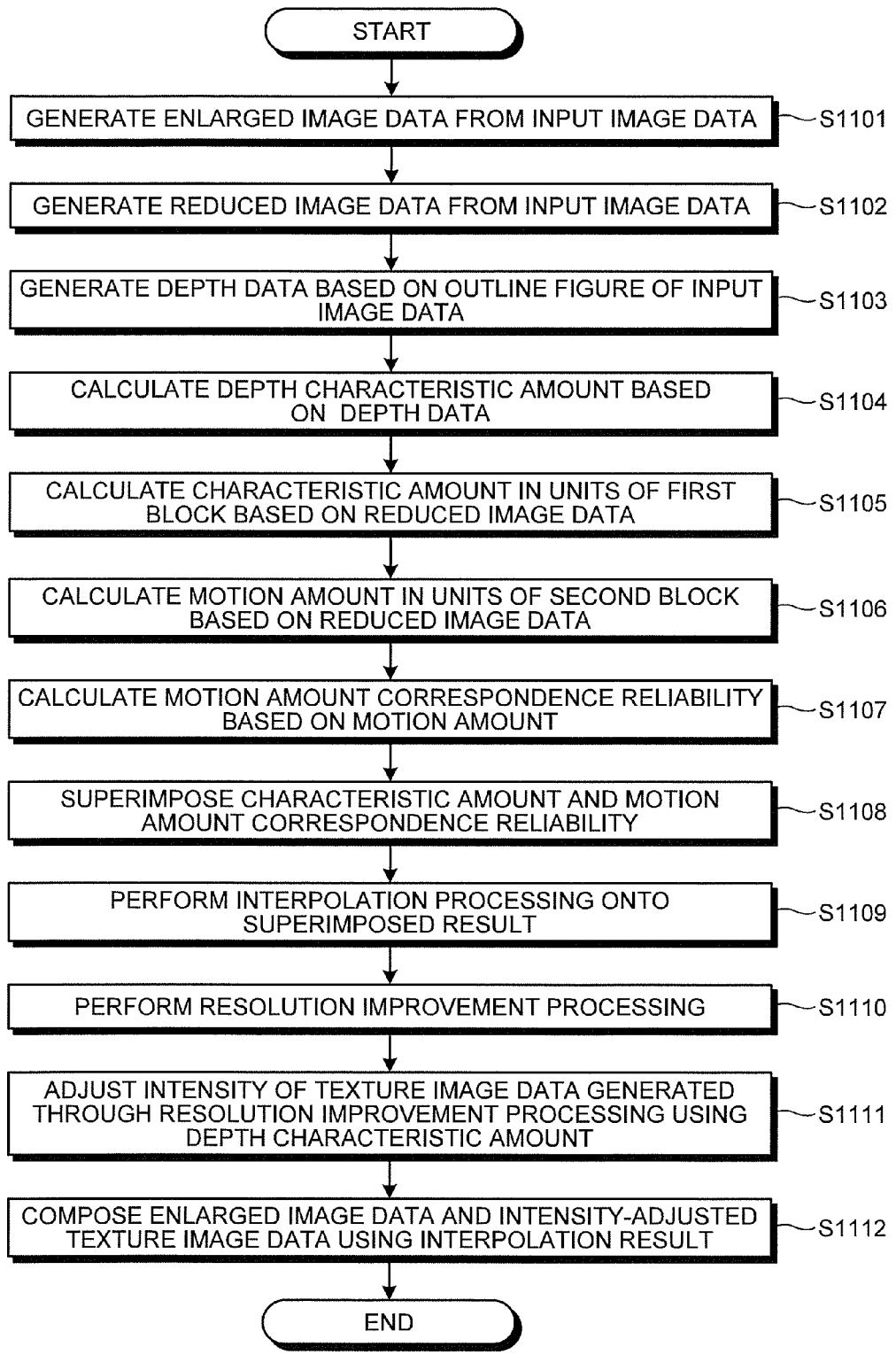

IMAGE PROCESSING APPARATUS AND IMAGE PROCESSING METHOD

CROSS-REFERENCE TO RELATED APPLICATIONS

This application is a continuation of PCT international application Ser. No. PCT/JP2013/060405, filed on Mar. 29, 2013, which designates the United States, incorporated herein by reference, and which is based upon and claims the benefit of priority from Japanese Patent Application No. 2012-189275, filed on Aug. 29, 2012, the entire contents of which are incorporated herein by reference.

FIELD

Embodiments described herein relate generally to an image processing apparatus and an image processing method.

BACKGROUND

In related art, various types of image processing are performed in a camera or a television receiving apparatus, for the purpose of improving the image resolution and image quality. One aspect of the image processing is a technology for adding a high-frequency image component such as a texture on a frame image. In related art, for example, a texture image is generated for each frame image and the texture is added on a high-frequency component image, thereby improving the texture of the image.

However, in related art, when a high-frequency image such as a texture is added for each frame image, an adjustment in consideration of the field displayed on the frame has been seldom performed.

BRIEF DESCRIPTION OF THE DRAWINGS

A general architecture that implements the various features of the invention will now be described with reference to the drawings. The drawings and the associated descriptions are provided to illustrate embodiments of the invention and not to limit the scope of the invention.

FIG. 11 is an exemplary flowchart of an image processing procedure performed by the image processor in the second embodiment.

DETAILED DESCRIPTION

In general, according to one embodiment, an image processing apparatus comprises: an enlarged-image generation module configured to generate enlarged image information that is enlarged with a predetermined magnification ratio from input image information; a depth characteristic calculator configured to calculate, from the input image information, a depth characteristic amount indicating a change level of depth of field for each a plurality of areas comprised in the input image information; and a generation module configured to compose image information comprising a predetermined high-frequency component onto the enlarged image information, based on the depth characteristic amount calculated by the depth characteristic calculator to generate output image information.

With reference to the accompanying drawings, embodiments of an image processing apparatus and an image processing method will be described in detail hereafter. In the embodiments, the image processing apparatus and the image processing method are applied to a television apparatus. However, the embodiment is not limited to this example.

First Embodiment

Figure 1:
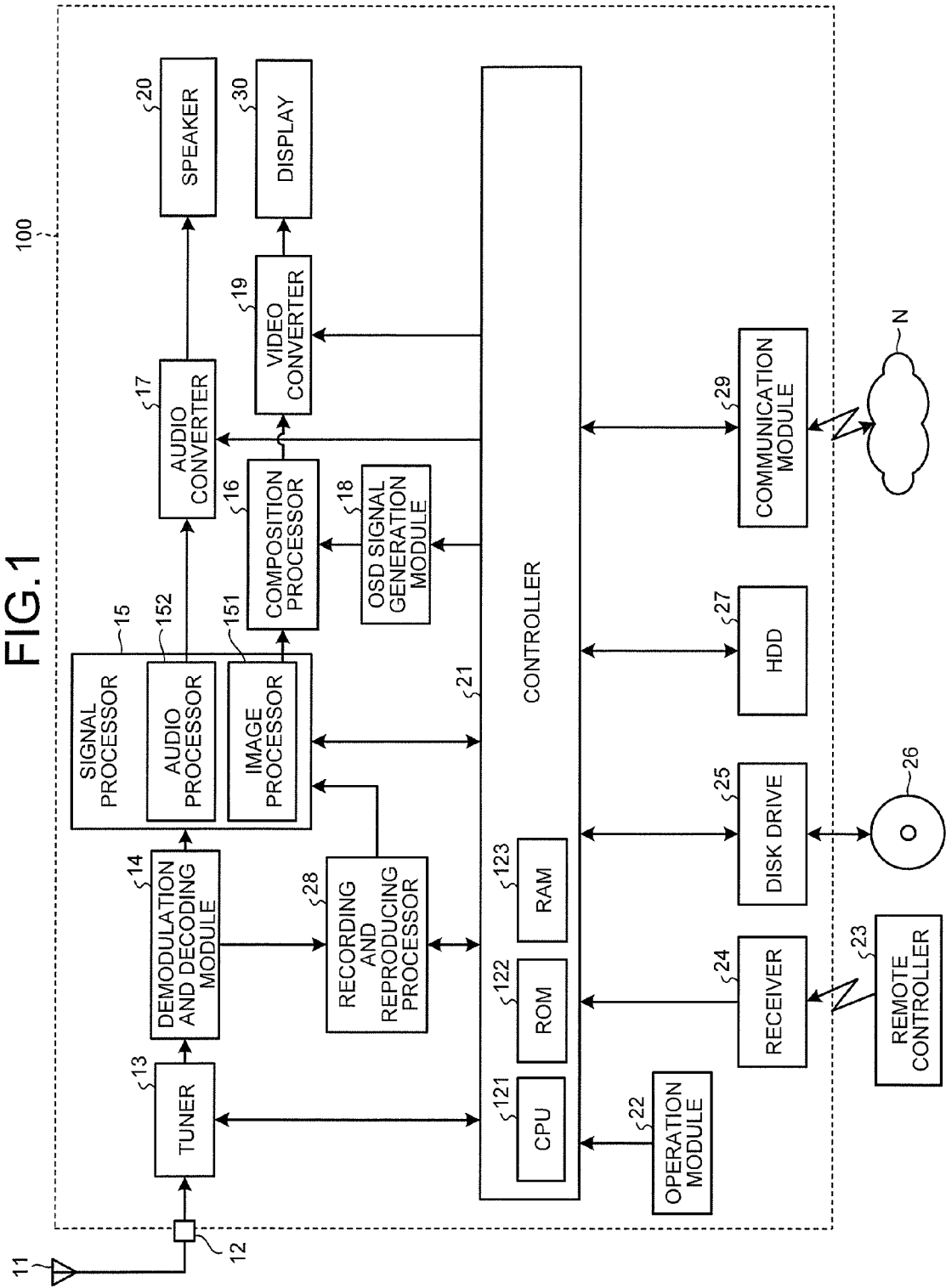
FIG. 1 is an exemplary structural diagram of a television apparatus according to a first embodiment.

FIG. 1 is a diagram of an example of the structure of a television apparatus 100 according to the first embodiment. As illustrated in FIG. 1, in the television apparatus 100, broadcast signals received by an antenna 11 is supplied to a tuner 13 through an input port 12, whereby broadcast signals of an intended channel can be selected.

In the television apparatus 100, the broadcast signals of the channel selected by the tuner 13 are supplied to a demodulation and decoding module 14, and then demodulated to a digital video signal and a digital audio signal. After that, the signals are output to a signal processor 15.

The signal processor 15 comprises an image processor 151 and an audio processor 152. The image processor 151 performs a predetermined image processing on the digital video signal supplied from the demodulation and decoding module 14. The audio processor 152 performs a predetermined audio processing on the digital audio signal supplied from the demodulation and decoding module 14.

The image processor 151 performs a predetermined image processing for improving image quality on the digital video signal supplied from the demodulation and decoding module 14 and outputs the resulting digital video signal to a composition processor 16. The audio processor 152 outputs the processed digital audio signal to an audio converter 17. The detailed structure of the image processor 151 will be described later.

The composition processor 16 superimposes an on-screen display (OSD) signal serving as a video signal for superimposition of a caption, a graphical user interface (GUI), and an OSD, for example, generated by an OSD signal generation module 18 onto the digital video signal supplied from the signal processor 15 (the image processor 151) and outputs the resulting signal.

In the television apparatus 100, the digital video signal that has been output from the composition processor 16 is supplied to a video converter 19. The video converter 19 converts the digital video signal that has been input into an analog video signal in a format that can be displayed on a display 30.

In the television apparatus 100, the analog video signal that has been output from the video converter 19 is supplied to the display 30 for displaying a video. The display 30 has a display device such as a liquid crystal display (LCD) for displaying thereon the analog video signal that has been output from the video converter 19.

The audio converter 17 converts the digital audio signal supplied from the signal processor 15 (the audio processor 152) into an analog audio signal in a format that can be reproduced on a speaker 20. The analog audio signal that has been output from the audio converter 17 is supplied to the speaker 20 for reproducing a sound.

In the television apparatus 100, a controller 21 controls overall operations comprising the above-described various receiving operations. The controller 21 comprises a central processing unit (CPU) 121, a read only memory (ROM) 122 that stores therein a computer program executed by the CPU 121, and a random access memory (RAM) 123 for providing a working area for the CPU 121. The controller 21 controls overall operations in the modules through collaboration with the CPU 121 and various types of computer programs.

Specifically, the controller 21 controls the modules and units of the television apparatus 100 to reflect the operation information input through an operation module 22 on the main body of the television apparatus 100, or the operation information transmitted from a remote controller 23 and received by a receiver 24.

The controller 21 obtains an electronic program guide (EPG) based on a signal decoded by the demodulation and decoding module 14 and supplies the electronic program guide to the OSD signal generation module 18 and the video converter 19 in response to operations input by a user through the operation module 22 or the remote controller 23, whereby the program guide of the programs being broadcasted now or the programs to be broadcasted in future is provided to the user. The electronic program guide comprises a program ID (e.g., a broadcast station and a broadcasting time) with which the program is identified, and other program information such as a title, a genre, an outline, and the cast of the program, for each program being broadcasted now or to be broadcasted in future.

The controller 21 may be coupled to a disk drive 25. An optical disc 26 such as a Blu-ray (registered trademark) disc and a digital versatile disk (DVD) is detachably loaded on the disk drive 25 that has a function to record and reproduce digital data on the loaded optical disc 26.

The controller 21 controls so that a digital video signal and a digital audio signal obtained from the demodulation and decoding module 14 are encoded based on operations through the operation module 22 or the remote controller 23 by the user through a recording and reproducing processor 28. After that, the resulting signals are converted into a predetermined recording format and supplied to the disk drive 25, and then recorded on the optical disc 26.

A hard disk drive (HDD) 27 is coupled to the controller 21. The HDD 27 may have a form of an external device. Once a program to be recorded is specified by the user through the operation module 22 or the remote controller 23, the controller 21 encodes a video signal and an audio signal of the program obtained from the demodulation and decoding module 14 (hereinafter, referred to as program data) using the recording and reproducing processor 28, converts the signals into a predetermined recording format, and supplies the signals to the HDD 27, thereby recording the program.

The controller 21 performs control so that a digital video signal and a digital audio signal are read from the program data recorded on the HDD 27 or on the optical disc 26 by the disk drive 25, depending on the operation by the user through the operation module 22 or the remote controller 23. After the signals are decoded through the recording and reproducing processor 28 and supplied to the signal processor 15, the controller 21 controls the resulting signals to be used for the above-described video display and sound reproduction.

A communication module 29 is also coupled to the controller 21. The communication module 29 is a communication interface that can be connected to a network N such as the Internet. The controller 21 transmits and receives various types of information to and from an external device (not illustrated) connected to the network N through the communication module 29.

Figure 2:
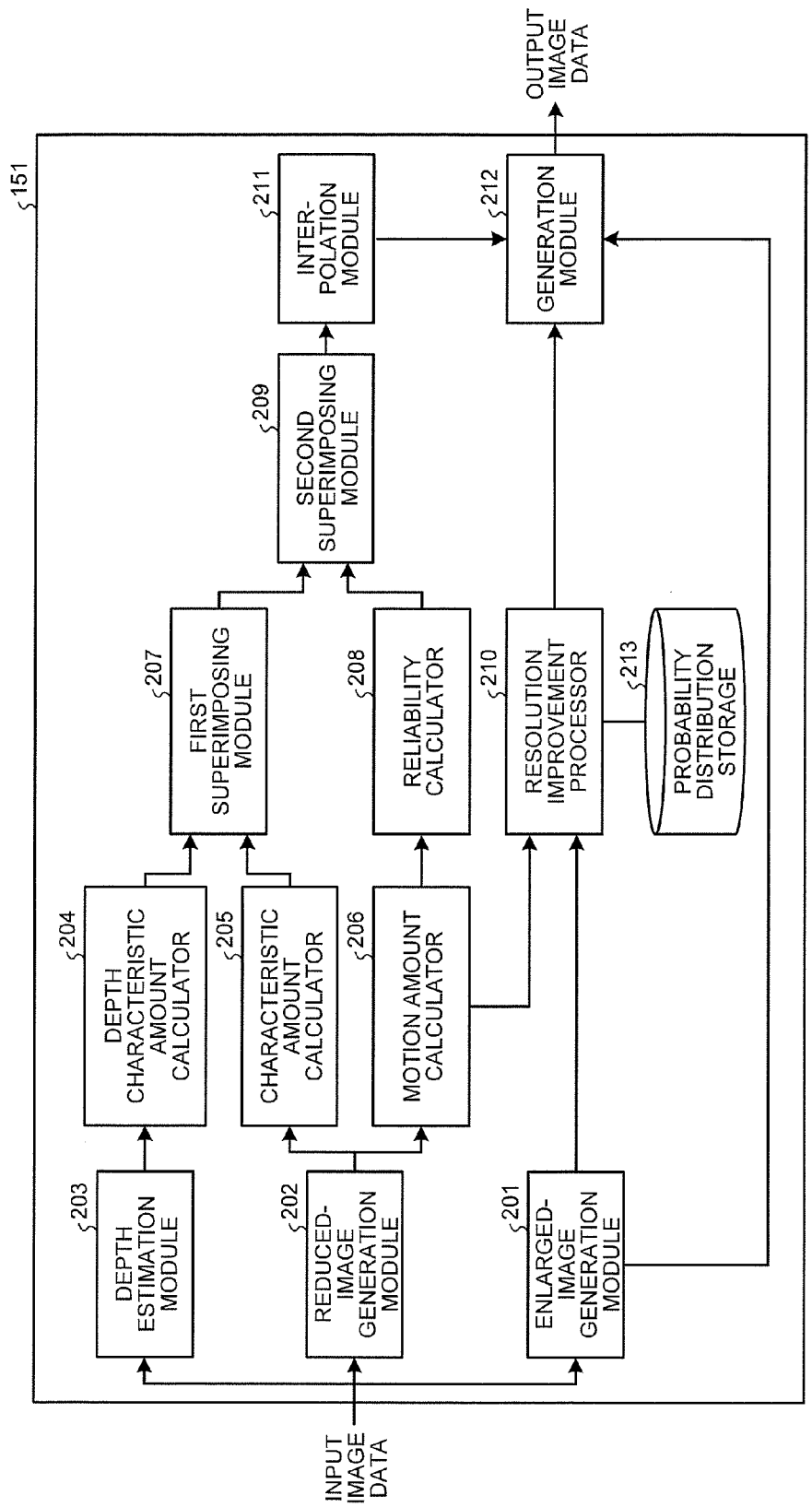
FIG. 2 is an exemplary functional structure diagram of an image processor in the first embodiment.

The function structure of the image processor 151 will now be described. FIG. 2 is a functional structure diagram of the image processor 151. As illustrated in FIG. 2, the image processor 151 comprises the followings as function modules relating to image processing of digital video signals: an enlarged-image generation module 201, a reduced-image generation module 202, a depth estimation module 203, a depth characteristic amount calculator 204, a characteristic amount calculator 205, a motion amount calculator 206, a first superimposing module 207, a reliability calculator 208, a second superimposing module 209, a resolution improvement processor 210, an interpolation module 211, a generation module 212, and a probability distribution storage 213. Digital image signals for each frame supplied from the demodulation and decoding module 14 will be referred to as input image data, hereinafter.

The enlarged-image generation module 201 performs enlargement processing on the input image data supplied from the demodulation and decoding module 14 with a predetermined magnification ratio to generate an enlarged image data. Subsequently, the enlarged-image generation module 201 outputs the enlarged image data to the resolution improvement processor 210 and the generation module 212. The enlarged image may be generated using various methods such as an interpolation algorithm including a cubic convolution algorithm. The enlarged size is not limited to specific ones, but it is preferred that the size is determined depending on the display size or the resolution of the display 30, for example. If the size of the input image data coincides with the size of the enlarged image data displayed on the display 30, the input image data may be output as the enlarged image data.

The reduced-image generation module 202 performs size reduction processing on the input image data supplied from the demodulation and decoding module 14 with a predetermined reduction ratio to generate a reduced image data. To prioritize accuracy, the reduced-image generation module 202 may not perform the reduction of the input image data and instead use the input image data for the post-processing. However, in the present embodiment, the load due to the later-described processing is mitigated through the reduction processing. The reduced image may be generated using various methods such as an interpolation algorithm including a bilinear interpolation algorithm or a bicubic interpolation algorithm.

The reduction ratio is not limited to specific ones in the embodiment and may be determined according to the size of a block serving as a unit to be processed by the motion amount calculator 206, which will be described later. The reduction may be performed with a ratio of 1/4 or 1/16, for example. The reduced-image generation module 202 outputs the reduced image data to the characteristic amount calculator 205 and the motion amount calculator 206.

The depth estimation module 203 estimates the outline figure of the input image data and generates the depth data thereof. The depth data in the embodiment (e.g., image data representing a sense of depth) represents the level of depth of field in the input image data with a gray scale. The format of the depth data is not limited to specific ones in the embodiment, and may be any type of data capable of recognizing the depth for each field comprised in the input image data. Any method can be used to estimate the outline figure, for example the method disclosed in Japanese Patent Application Laid-open No. 2012-15744 can be used.

The depth characteristic amount calculator 204 generates a depth characteristic amount for the depth data generated by the depth estimation module 203 using a predetermined method. A predetermined method is a conversion method using a linear function, for example. The depth characteristic amount represents a characteristic amount representing changes of the depth in a predetermined first block unit. The value of the depth characteristic amount ranges from 0.0 to 1.0, for example. The depth characteristic amount is used when the percentage of a texture component to be added is changed. The first block to be calculated for the depth characteristic amount may be structured in a pixel unit or a block unit. The block unit may be 4×4 pixels, for example.

The characteristic amount calculator 205 performs a characteristic analysis of an image using a reduced image in units of the first block of the reduced image and calculates a characteristic amount representing the characteristic of the image. The characteristic amount is a value that represents change of a pixel value in the first block. In the embodiment, the first block unit may be, for example, a block unit comprising 4×4 pixels corresponding to the first block calculated by the depth characteristic amount calculator 204, which will be superimposed. Another size may be employed if the correspondence can be verified.

Any calculation method can be used for the characteristic amount. For example, a method can be used in which linear or non-linear conversion is performed based on an activity representing the change level of pixel values (e.g., brightness) between the adjacent pixels. The value of the characteristic amount ranges from 0.0 to 1.0, for example. The characteristic amount is used when the percentage of a texture component to be added is changed. The characteristic amount obtained from the analysis is not limited to one value, but a value obtained by converting a plurality of analysis results may be used. In the present embodiment, any calculation method may be used for the characteristic amount, regardless of whether it is a publicly known technology.

The motion amount calculator 206 calculates the motion amount generated between the reduced image data of the current frame and the reduced image data of the previous frame to the current frame out of a plurality pieces of timely consecutive reduced image data generated by the reduced-image generation module 202, for every predetermined second block comprised in the reduced image, based on a motion vector quantity of the reduced image extracted by performing motion vector searching. The second block unit to be calculated may be 8×8 pixels, or other sizes and pixel units. The size of the second block unit is not limited to specific ones. However, it is preferred that the size is a unit of an area corresponding to the first block with which the characteristic amount and the depth characteristic amount are calculated. Specifically, the size value is an integral multiple or integral division of the first block. A publicly known technology is employed for calculating the motion vector search and the motion amount.

The reliability calculator 208 calculates motion amount correspondence reliability in units of the second block (e.g., 8×8 pixels) based on the motion amount calculated by the motion amount calculator 206. The motion amount correspondence reliability is obtained by applying an appropriate primary expression depending on whether the motion amount is larger than a threshold. For example, the value of the motion amount correspondence reliability becomes larger as the motion amount is smaller, and becomes smaller as the motion amount is larger. In other words, the smaller the motion, the more the image quality improved.

The first superimposing module 207 superimposes the characteristic amount calculated by the characteristic amount calculator 205 and the depth characteristic amount calculated by the depth characteristic amount calculator 204 for each corresponding area. In the present embodiment, superimposition may be performed in units of the first block, 4×4 pixels, for example.

The second superimposing module 209 superimposes the result of superimposition obtained from the first superimposing module 207 and the motion amount correspondence reliability calculated by the reliability calculator 208 for each area. This superimposition is also performed following the corresponding area. For example, the result of superimposition obtained in units of 4×4 pixels is superimposed on the motion amount correspondence reliability calculated in units of 8×8 pixels so that the corresponding areas matches to each other. The value of the resulting characteristic amount ranges from 0.0 to 1.0, for example.

The above-described superimposition processing is performed for each block, thus the characteristic amount varies on the boundary of the blocks, whereby the shape of the blocks are likely to stand out. Therefore, in the present embodiment, interpolation is performed by the interpolation module 211. In the present embodiment, interpolation is performed for each block. However, the embodiment is not limited to this example and the interpolation may be performed for each pixel with a size of 1×1 pixel.

The interpolation module 211 interpolates the superimposition characteristic amount at each position in the block to be processed using an interpolation coefficient based on the positional relationship between the block to be processed (hereinafter, referred to as a processing target block) and a block adjacent to the processing target block (hereinafter, referred to as a reference block) in order to reduce the difference between the superimposition characteristic amounts of the blocks adjacent to each other. Before interpolation processing, the interpolation module 211 performs enlargement processing to the extent so that the size of the reduced image data matches the size of the enlarged image data. In the present embodiment, the first block (4×4 pixels) of the reduced image data is enlarged to 32×32 pixels through the enlargement processing. The block of this size is referred to as a third block.

Figure 3:
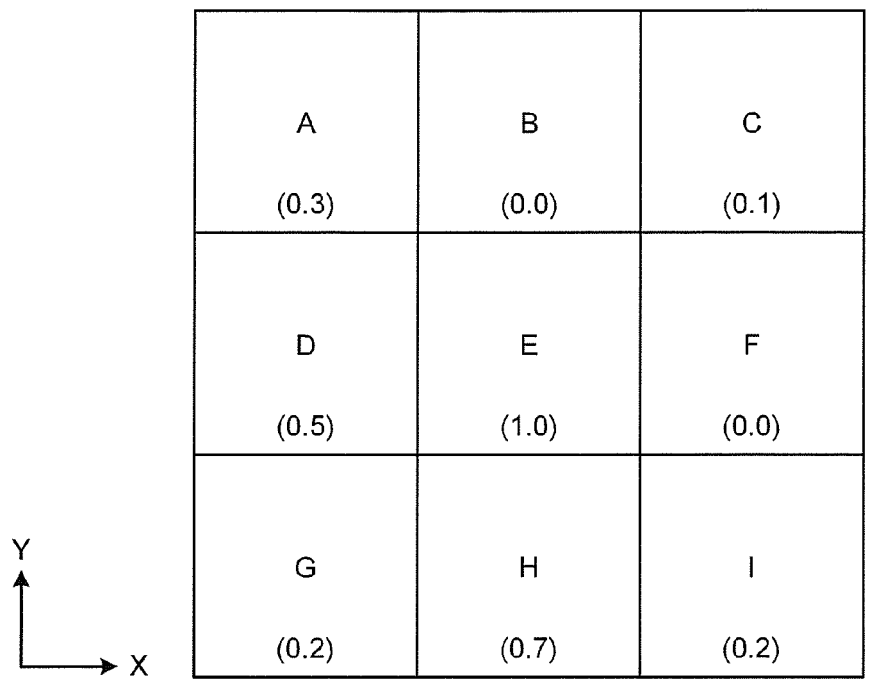
FIG. 3 is an exemplary diagram for explaining a setting method example of an interpolation coefficient used by an interpolation module in the first embodiment.

FIG. 3 is a diagram for explaining a setting method example of an interpolation coefficient used by the interpolation module 211. The blocks A, B, C, D, E, F, G, H, and I illustrated in FIG. 3 are third blocks comprising 32×32 pixels. FIG. 3 is a diagram illustrating the relationship of the processing target block and the reference block. In FIG. 3, a third block E serves as the processing target block and thus the third blocks A to D and F to I adjacent to the third block E serve as a reference block. The values in parenthesis "( )" of the third blocks are the superimposition characteristic amounts, and the threshold a is "0.0".

Figure 4:
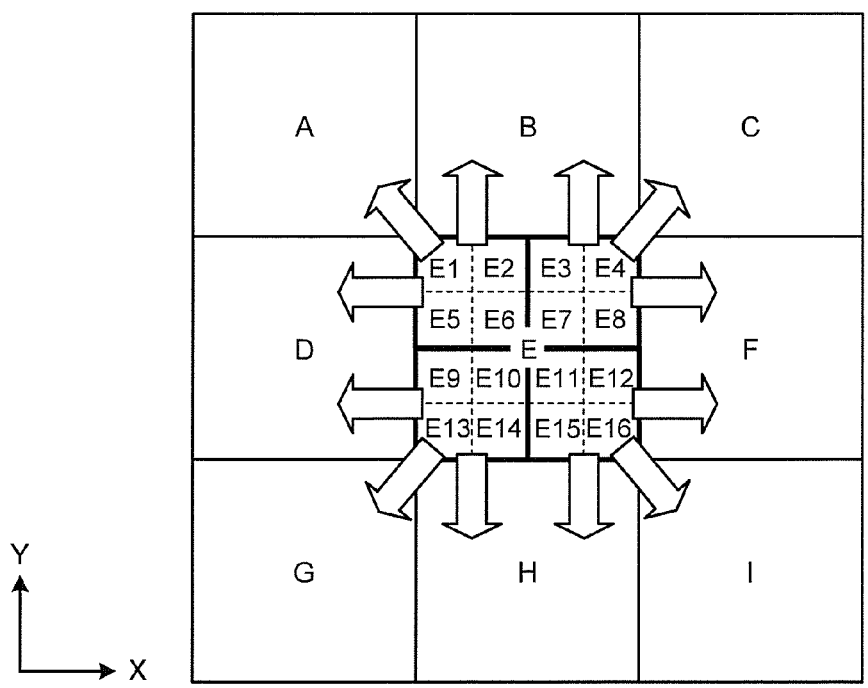
FIG. 4 is an exemplary diagram of division example of a block to be processed.

As illustrated in FIG. 3, because the value of the superimposition characteristic amount of the third block E, which is the processing target block, is 1.0 and thus exceeds the threshold α, the interpolation module 211 divides the first block E into a plurality of sub-blocks as illustrated in FIG. 4.

FIG. 4 is a diagram of division example of the processing target block. In FIG. 4, the third block E, which is the processing target block, is divided into 16 sub-blocks E1 to E16, each of which comprises 8×8 pixels.

In FIG. 4, the interpolation module 211 refers to the superimposition characteristic amounts of the reference blocks adjacent to the third block E (the third blocks A to D and F to I) and determines whether the reference block exists, having a superimposition characteristic amount equal to or less than the threshold α. In this example illustrated in FIG. 3, the superimposition characteristic amounts of the third blocks B and F are (0.0), thus the interpolation module 211 determines that the superimposition characteristic amounts of the third blocks B and F are equal to or less than the threshold α, and those of the third blocks A, C, D, and G to I exceed the threshold α.

According to the determination result, the interpolation module 211 sets the interpolation coefficients in the X direction and the Y direction for each of the sub-blocks E1 to E16. The interpolation module 211 selects the reference blocks used for setting the interpolation coefficients depending on the arranged position of the sub-blocks E1 to E16, out of the third blocks A to D and F to I.

For example, in the state illustrated in FIG. 4, the interpolation module 211 selects the third blocks A, B, and D that are adjacent to the sub-blocks E1, E2, E5, and E6 arranged in the upper left direction in the third block E. The interpolation module 211 also selects the third blocks B, C, and F that are adjacent to the sub-blocks E3, E4, E7, and E8 arranged in the upper right direction in the third block E. The interpolation module 211 further selects the third blocks D, G, and H that are adjacent to the sub-blocks E9, E10, E13, and E14 arranged in the lower left direction in the third block E. Likewise, the interpolation module 211 selects the third blocks F, H, and I that are adjacent to the sub-blocks E11, E12, E15, and E16 arranged in the lower right direction in the third block E. As described above, the interpolation module 211 sets the interpolation coefficients using the reference blocks closer to the arranged position of the sub-blocks.

For example, in respect to the sub-block E6, the superimposition characteristic amount of the third block B out of the third blocks A, B, and D, which are the reference blocks, is equal to or less than the threshold α. Therefore, the interpolation module 211 sets the interpolation coefficient of the sub-block E6 in the Y direction, in which the third block B exists, with reference to the center of the third block E and the boundary of the third block B. In the X direction, where no reference block having the superimposition characteristic amount equal to or less than the threshold α exists, the interpolation module 211 sets the interpolation coefficient in the X direction with reference to the center of the third block E and the centers of the reference blocks (the third blocks A, B, and D). Subsequently, the interpolation module 211 interpolates the superimposition characteristic amount of the sub-block E6 using the interpolation coefficients determined for each direction.

Figure 5:
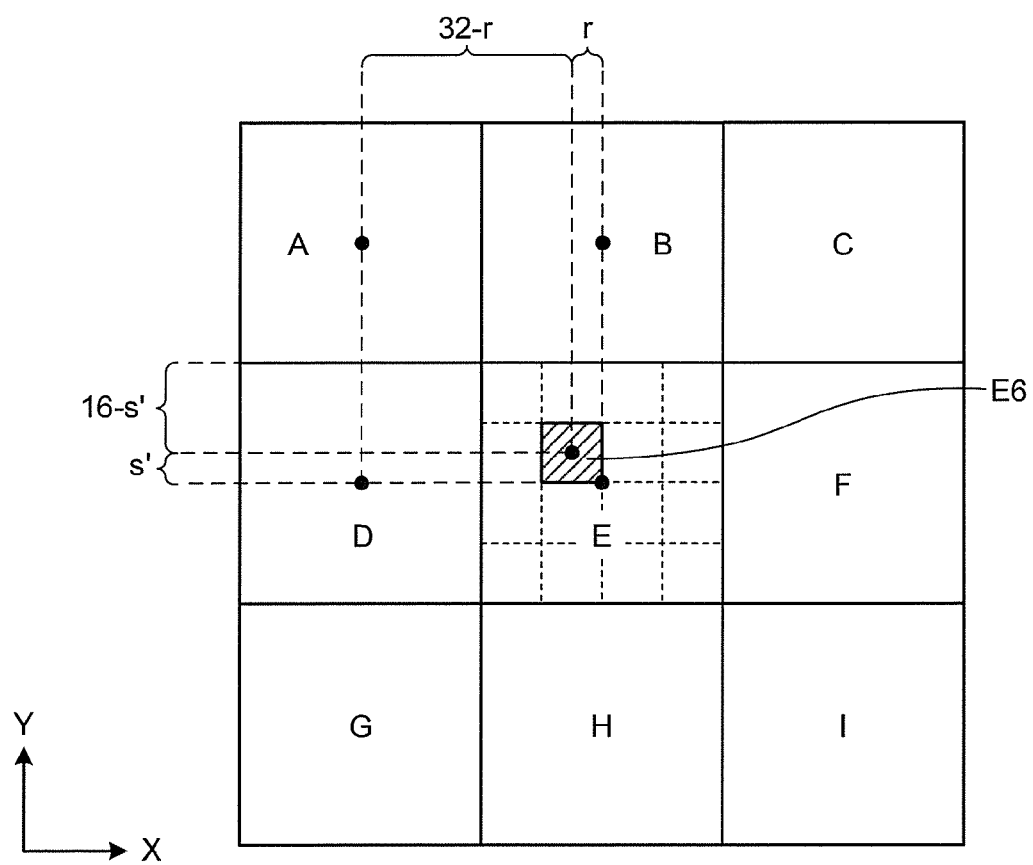
FIG. 5 is an exemplary diagram for explaining a setting method example of the interpolation coefficient used by the interpolation module in the first embodiment.

FIG. 5 is a diagram for explaining a setting method example of the interpolation coefficient used by the interpolation module 211. In FIG. 5, the distance is represented in a pixel unit. The distance between the center of the third block E, which is the processing target block, and any pixel in the sub-block E6 (e.g., the pixel in the center) in the X direction is represented as "r", and the distance of that in the Y direction is represented as "s". For convenience of description, the position of any pixel in the sub-block E6 is described as the position of the sub-block E6, hereinafter.

As described above, the interpolation module 211 sets the interpolation coefficient of the sub-block E6 in the Y direction with reference to the center of the third block E and the boundary of the third block B. Any method can be used for the interpolation, for example the bilinear interpolation algorithm can be used.

The interpolation module 211 obtains an interpolation characteristic amount as a result of interpolation of the superimposition characteristic amount of the sub-block E6 using Equation 1, for example. The superimposition characteristic amounts of the third blocks A, B, and D, which are the reference blocks, are input to "A", "B", and "D" in the following Equation 1, and the superimposition characteristic amount of the third block E is input to "E", which is the processing target block.

$$\text{The interpolation characteristic amount} = (A^*(r/32) + B^*((32-r)/32))^*(s'/16) + (D^*(r/32) + E^*((32-r)/32))^*((16-s')/16) \quad \text{Equation 1}$$

Figure 6:
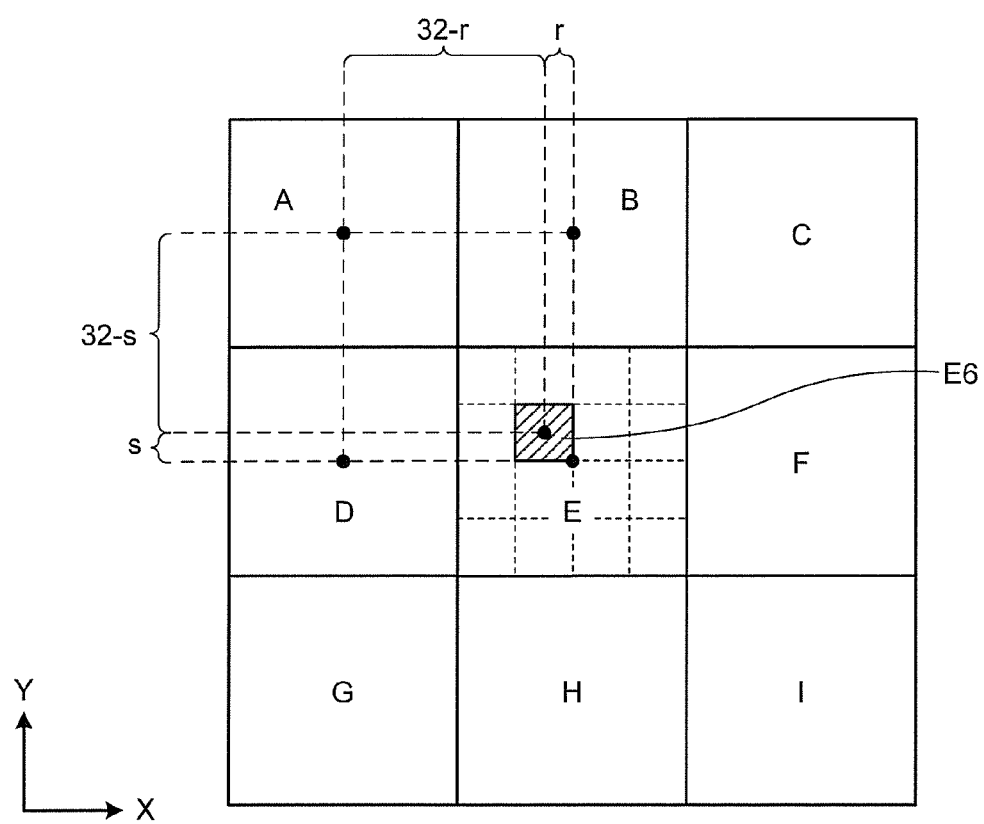
FIG. 6 is an exemplary diagram for explaining another setting method example of the interpolation coefficient used by the interpolation module in the first embodiment.

FIG. 6 is a diagram for explaining a setting method example of the interpolation coefficient used by the interpolation module 211 when the superimposition characteristic amounts of all of the reference blocks exceed the threshold α. In FIG. 6, the interpolation coefficient of the sub-block E6 is illustrated likewise in FIG. 5, for explanation in contrast to the setting method illustrated in FIG. 5.

If the superimposition characteristic amounts of all of the reference blocks exceed the threshold α, the interpolation module 211 sets the interpolation coefficients in the X direction and the Y direction, with reference to the positional relationship of the center of the third block E and the centers of the reference blocks (the third blocks A, B, and D) against the position of the sub-block E6. In this example, the interpolation module 211 obtains the interpolation characteristic amount of the sub-block E6 using Equation 2, for example.

$$\text{The interpolation characteristic amount} = (A^*(r/32) + B((32-r)/32))^*(s/32) + (D^*(r/32) + E^*((32-r)/32))^*((32-s)/32) \quad \text{Equation 2}$$

An equation to obtain the interpolation characteristic amount is not limited to the above-described one and other equations may be used. In the above example, the superimposition characteristic amount of the third block B is equal to or less than the threshold α. If the superimposition characteristic amount of another reference block is equal to or less than the threshold α, the processing is performed in the same manner and overlapped explanation thereof will be omitted.

In the interpolation module 211 according to the present embodiment, if the superimposition characteristic amount of the processing target block is equal to or less than the threshold α, the superimposition characteristic amount is maintained. If the superimposition characteristic amount of the processing target block exceeds the threshold α, a condition relating to the positional relationship of the processing target block and the reference block, which is the reference of the interpolation coefficient, is changed depending on whether the superimposition characteristic amount of the adjacent reference block is equal to or less than the threshold α. The interpolation module 211 then interpolates the superimposition characteristic amount using the interpolation coefficient. Therefore, in the third block having a superimposition characteristic amount equal to or less than the threshold α, the difference of the superimposition characteristic amounts between the third blocks adjacent to each other can be reduced while the superimposition characteristic amounts are maintained. As a result, the possibility of occurrence of an artifact noise can be reduced, whereby image quality deterioration can be suppressed.

The resolution improvement processor 210 calculates gradient characteristic data for each pixel comprised in the enlarged image data. The gradient characteristic data is characteristic information representing changes of pixel values in a predetermined display area around the pixels for each pixel comprised in the enlarged image data. For example, the resolution improvement processor 210 calculates the gradient characteristic data for each pixel comprised in the enlarged image data using a differential filter. In the present embodiment, the resolution improvement processor 210 calculates the gradient characteristic data in the horizontal direction using a horizontal differential filter and the gradient characteristic data in the vertical direction using a vertical differential filter, for each pixel. The size of the filter to be used for the calculation is around 3×3 to 5×5 pixels, for example, but not limited to this example. In the description below, the gradient characteristic in the horizontal direction may be referred to as "Fx", and the gradient characteristic in the vertical direction may be referred to as "Fy". In the present embodiment, the gradient characteristic data is used as an example of the characteristic data for each pixel, however, the embodiment is not limited to this example. Any other characteristic data can be used as long as the difference from other pixels can be recognized for each pixel.

The resolution improvement processor 210 calculates the gradient intensity of a local gradient pattern, which is a weight relating to a high-frequency component per pixel comprised in the enlarged image data. The calculation is performed according to the probability distribution representing the relative value distribution of the gradient characteristic data of the high-frequency component per pixel comprised in the image data for learning against the gradient characteristic data per pixel comprised in the image data for learning, and the calculated gradient characteristic data (Fx, Fy).

In the embodiment, the local gradient pattern is a predetermined image pattern representing a pattern of changes of pixel values preliminarily determined (e.g., brightness values). The gradient intensity is a weight relating to the high-frequency component per pixel comprised in the enlarged image data, which is calculated according to the gradient characteristic. The gradient intensity is used for generating the high-frequency component of the enlarged image data.

The resolution improvement processor 210 weighs the local gradient pattern with the gradient intensity and generates texture image data representing the high-frequency component for the enlarged image data. The local gradient pattern and the gradient intensity will be described in detail later.

Figure 7:
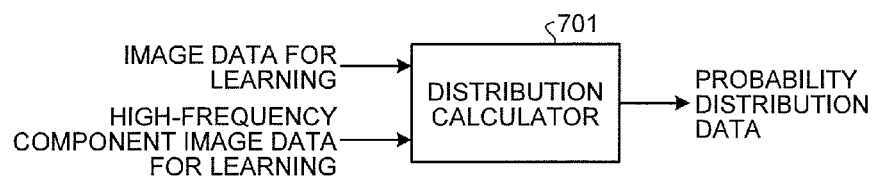
FIG. 7 is an exemplary diagram of a distribution calculator in the first embodiment.

In the embodiment, the probability distribution is a distribution of the relative angles and amounts of the gradient per pixel of the high-frequency component image data for learning against the gradient per pixel of the image data for learning, as the above-described relative value distribution. The probability distribution will now be described. FIG. 7 is a diagram of a distribution calculator 701 according to the first embodiment. The distribution calculator 701 may be provided in the television apparatus 100. Alternatively, the distribution calculator 701 may be provided outside of the television apparatus 100 and the probability distribution calculated by the distribution calculator 701 may be stored in the television apparatus 100.

As illustrated in FIG. 7, the distribution calculator 701 inputs the image data for learning and the high-frequency component image data for learning, and outputs the probability distribution data. The output probability distribution data is stored in the probability distribution storage 213.

Figure 8:
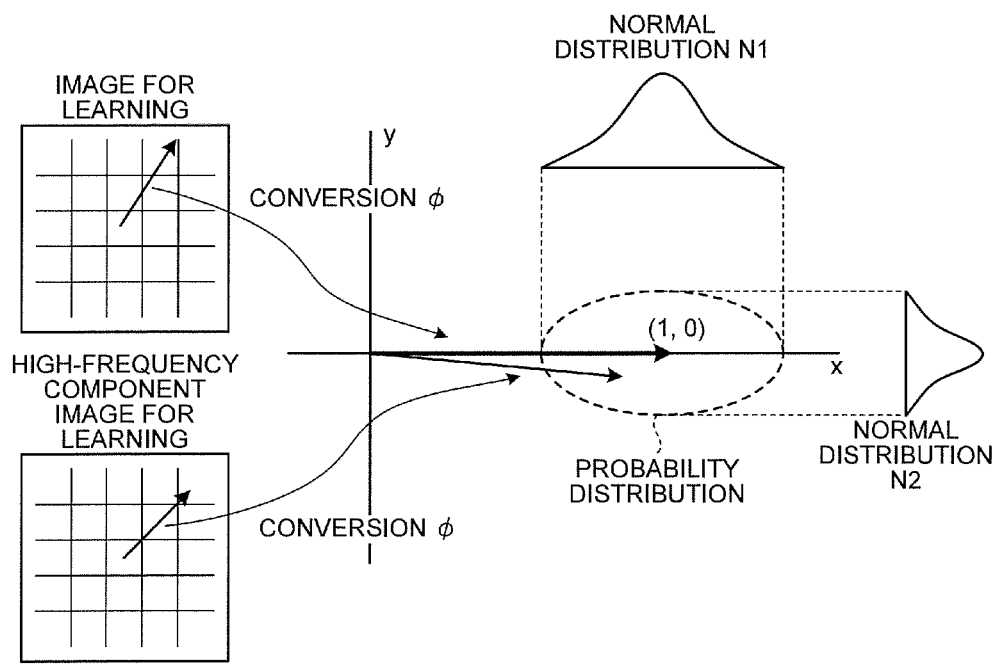
FIG. 8 is an exemplary diagram for explaining probability distribution in the first embodiment.

FIG. 8 is a diagram for explaining probability distribution according to the first embodiment. The distribution calculator 701 calculates the gradient at the pixel in a position in the image data for learning and the gradient at the pixel in the same position in the high-frequency component image data for learning. The differential filter used for the gradient calculation is the same filter used by the resolution improvement processor 210. The high-frequency component image data for learning is image data of the high-frequency component in the image data for learning. Note that the image quality of the image data for learning may be deteriorated like the enlarged image data.

As illustrated in FIG. 8, the distribution calculator 701 calculates the probability distribution in an area on a two-dimensional plane. The x-axis in the plane area is a gradient direction of each pixel of the image data for learning and the y-axis is a direction perpendicular to the gradient direction. The distribution calculator 701 converts the gradient of each pixel comprised in the image data for learning into a vector of (1,0). The conversion matrix in which the gradient of an arbitrary pixel is converted into a vector of (1,0) is determined as "conversion φ". The distribution calculator 701 converts the gradient of the pixel in the high-frequency component image data for learning in the same position as the above-described arbitrary pixel using the conversion φ. As a result, a vector of the gradient for each pixel of the high-frequency component image data for learning is obtained, which has been relatively converted with reference to the gradient for each pixel of the image data for learning.

The distribution calculator 701 calculates vectors of the gradients of the above-described high-frequency component for each pixel, thereby calculating the probability distribution enclosed with a dashed line in FIG. 8, which represents variation of the gradients of the high-frequency component image data for learning. As illustrated in FIG. 8, the probability distribution is represented with two-dimensional normal distribution, "normal distribution N1" and "normal distribution N2".

In the television apparatus 100 according to the present embodiment, the probability distribution calculated through the above-described processing is preliminarily stored in the probability distribution storage 213.

The resolution improvement processor 210 calculates the gradient intensity using the probability distribution and the gradient characteristic data. The average of "normal distribution N1" is referred to as "μ1" and the standard deviation thereof is referred to as "σ1". The average of "normal distribution N2" is referred to as "μ2" and the standard deviation thereof is referred to as "σ2". The resolution improvement processor 210 obtains a random variable "α" from the "normal distribution N1" and a random variable "β" from the "normal distribution N2". Then, the resolution improvement processor 210 substitutes the random variable "α", the random variable "β", and the gradient characteristic data (Fx, Fy) in the following Equation 3 to calculate the gradient intensity of the high-frequency component.

$$fx = \alpha Fx + \beta Fy, \; fy = \alpha Fy - \beta Fx \qquad \text{Equation 3}$$

In Equation 3, "fx" represents the gradient intensity in the horizontal direction and "fy" refers to the gradient intensity in the vertical direction.

Subsequently, the resolution improvement processor 210 generates the high-frequency component for the input image data, according to the gradient intensity of the high-frequency component (horizontal direction: fx, vertical direction: fy)

and the local gradient pattern (horizontal direction: Gx, vertical direction: Gy). "Gx" and "Gy" are predetermined image patterns representing a pattern of changes of pixel values preliminarily determined. In the present embodiment, a base pattern is employed, which has the same brightness changes as the filter used for the calculation of the gradient of the high-frequency component image for learning by the distribution calculator 701.

Specifically, the resolution improvement processor 210 substitutes the gradient intensity (horizontal direction: fx, vertical direction: fy) and the local gradient pattern (horizontal direction: Gx, vertical direction: Gy) in the following Equation 4 to calculate the high-frequency component "T" for each pixel comprised in the enlarged image data. The high-frequency component image data comprising the high-frequency component "T" calculated for each pixel is determined as the texture image data in the present embodiment. The texture image data has the same display area size as the enlarged image data in the present embodiment.

$$T = fx \cdot Gx + fy \cdot Gy \quad \text{Equation 4}$$

The resolution improvement processor 210 obtains the gradient intensity of the high-frequency component, according to the probability distribution representing distribution of vectors serving as the relative amounts and angles of the gradient of the high-frequency component image data for learning against the gradient of the image data for learning, and the gradient characteristic calculated by the resolution improvement processor 210.

the resolution improvement processor 210 generates the high-frequency component of the enlarged image data that has been subsequently input using the motion amount between the enlarged image data that has been input subsequently and the enlarged image data that has been input previously. In the present embodiment, the sizes of the display area differ between the image data used for searching the motion amount (the reduced image data) and the enlarged image data. Therefore, in the embodiment, the resolution improvement processor 210 enhances the motion amount depending on the enlarged image data.

Specifically, the resolution improvement processor 210 obtains the random variable of the pixel in the enlarged image data, according to the motion vector calculated by the motion amount calculator 206. In the embodiment, the resolution improvement processor 210 determines the previous position of the pixel in the enlarged image data before the motion, according to the calculated motion vector, and obtains the random variable of the determined position from the probability distribution storage 213. For example, the resolution improvement processor 210 obtains the random variable "α" and the random variable "β" from a memory area in the probability distribution storage 213 corresponding to the coordinate position of the enlarged image data, which has been processed immediately before being represented by the motion vector calculated by the motion amount calculator 206. If the previous coordinate of the enlarged image data before the motion represented by the motion vector is (k, l) when the motion vector currently represents the coordinate (i, j) of the enlarged image data, and the memory area of the probability distribution storage 213 is "M×N", for example, the resolution improvement processor 210 obtains the random variable of the coordinate (i, j) from the position of the probability distribution storage 213, (k mod M, l mod N). Here, "k mod M" refers to a remainder when "k" is divided by "M", and "l mod N" refers to a remainder when "l" is divided by "N".

According to the present embodiment, it can be known which random variable is utilized against the input image processed immediately before. In addition, the probability distribution storage 213 is utilized using the memory area corresponding to the coordinate represented by the motion vector to the input image processed immediately before, whereby flickering is suppressed when a moving image is processed.

The resolution improvement processor 210 calculates the gradient intensity of the high-frequency component by substituting the obtained random variable "α" and random variable "β", and the gradient characteristic (Fx, Fy) calculated by the resolution improvement processor 210 in Equation 3 for each pixel that is comprised in the enlarged image data and moved from the previous enlarged image data.

Subsequently, the resolution improvement processor 210 calculates the high-frequency component "T" for each pixel comprised in the enlarged image data by substituting the calculated gradient intensity of the high-frequency component (horizontal direction: fx, vertical direction: fy) and the local gradient pattern (horizontal direction: Gx, vertical direction: Gy) in Equation 4. The high-frequency component image data comprising the high-frequency component "T" calculated for each pixel is determined as the texture image data in the present embodiment. The texture image data has the same display area size as the enlarged image data in the present embodiment.

If high definition (HD) image data is simply enlarged to the image data of 4K2K, the enlarged image data has a weak texture and blurry appearance. By contrast, the texture image data comprises the high-frequency component as described above. Accordingly, when the television apparatus 100 displays on the display the output image data generated by superimposing the texture image data on the target image data, a more detailed texture can be displayed. Therefore, the image quality of the image data is improved and high image quality can be achieved.

However, if the texture image data is simply superimposed on the enlarged image data, a detailed pattern or design is highlighted in an active display area, which may be recognized as a noise by a user.

To solve this problem, the generation module 212 composes predetermined texture image data generated by the resolution improvement processor 210 on the enlarged image data with the intensity depending on the interpolation characteristic amount interpolated by the interpolation module 211 to generate the output image data. When composing the data, it is controlled so that the same areas are superimposed on each other.

In the present embodiment, the interpolation module 211 performs interpolation to suppress the differences of the adjacent blocks. Therefore, visibility of the block boundaries can be suppressed, thereby suppressing deterioration of image quality. As a result, the image quality of the output image data can be improved.

Figure 9:
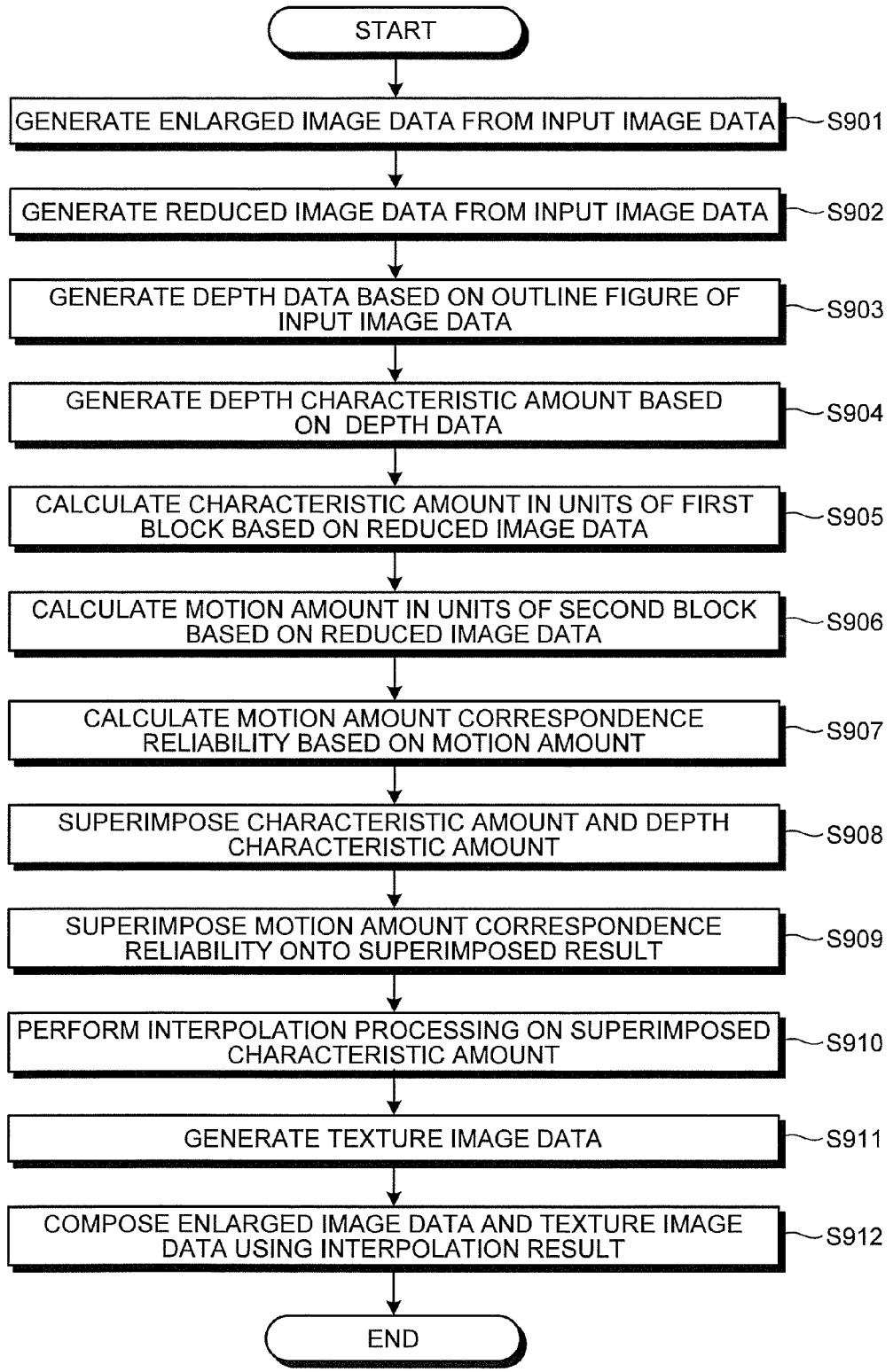
FIG. 9 is an exemplary flowchart of an image processing procedure performed by the image processor in the first embodiment.

The operations of the television apparatus 100 in the embodiment will now be described. FIG. 9 is a flowchart of an image processing procedure performed by the image processor 151.

When the input images in units of frames are input from the demodulation and decoding module 14 to the signal processor 15, the enlarged-image generation module 201 sequentially enlarges the pieces of input image data to a predetermined enlarged size to generate the pieces of enlarged image data (S901). The reduced-image generation module 202 also sequentially reduces the pieces of input image data to a predetermined reduced size to generate the pieces of reduced image data (S902).

In addition, the depth estimation module 203 sequentially generates the pieces of depth data from the pieces of input image data (S903).

Then, the depth characteristic amount calculator 204 generates the pieces of depth characteristic amount, according to the pieces of depth data generated by the depth estimation module 203 (S904).

The characteristic amount calculator 205 calculates the characteristic amount of the reduced image data in units of the first block from the reduced image data generated by the reduced-image generation module 202 (S905).

The motion amount calculator 206 performs the motion vector search, thereby calculating the motion amount in units of a predetermined second block comprised in the reduced image data (S906).

Then, the reliability calculator 208 calculates the motion amount correspondence reliability in units of the second block calculated by the motion amount calculator 206 (S907).

Subsequently, the first superimposing module 207 superimposes the characteristic amount onto the depth characteristic amount in units of the first block (S908). After that, the second superimposing module 209 matches the correspondence between the first block and the second block, and then superimposes the result of superimposition of S908 and the motion amount correspondence reliability (S909).

The interpolation module 211 then performs interpolation on the result of superimposition (the superimposition characteristic amount) of S909 (S910).

The resolution improvement processor 210 generates the texture image data according to the motion amount calculated by the motion amount calculator 206 (S911).

After that, the generation module 212 composes the texture image data generated by the resolution improvement processor 210 with the intensity corresponding to the interpolation characteristic amount interpolated by the interpolation module 211 on the enlarged image data to generate the output image data (S912).

As described above, according to the present embodiment, through the above-described processing, a high-quality image can be generated while occurrence factors of an artifact noise are reduced. Therefore, high image quality can be achieved.

Second Embodiment

In the second embodiment, an image processor 1000, which has a different structure from the television apparatus 100 in the first embodiment, will be described.

Figure 10:
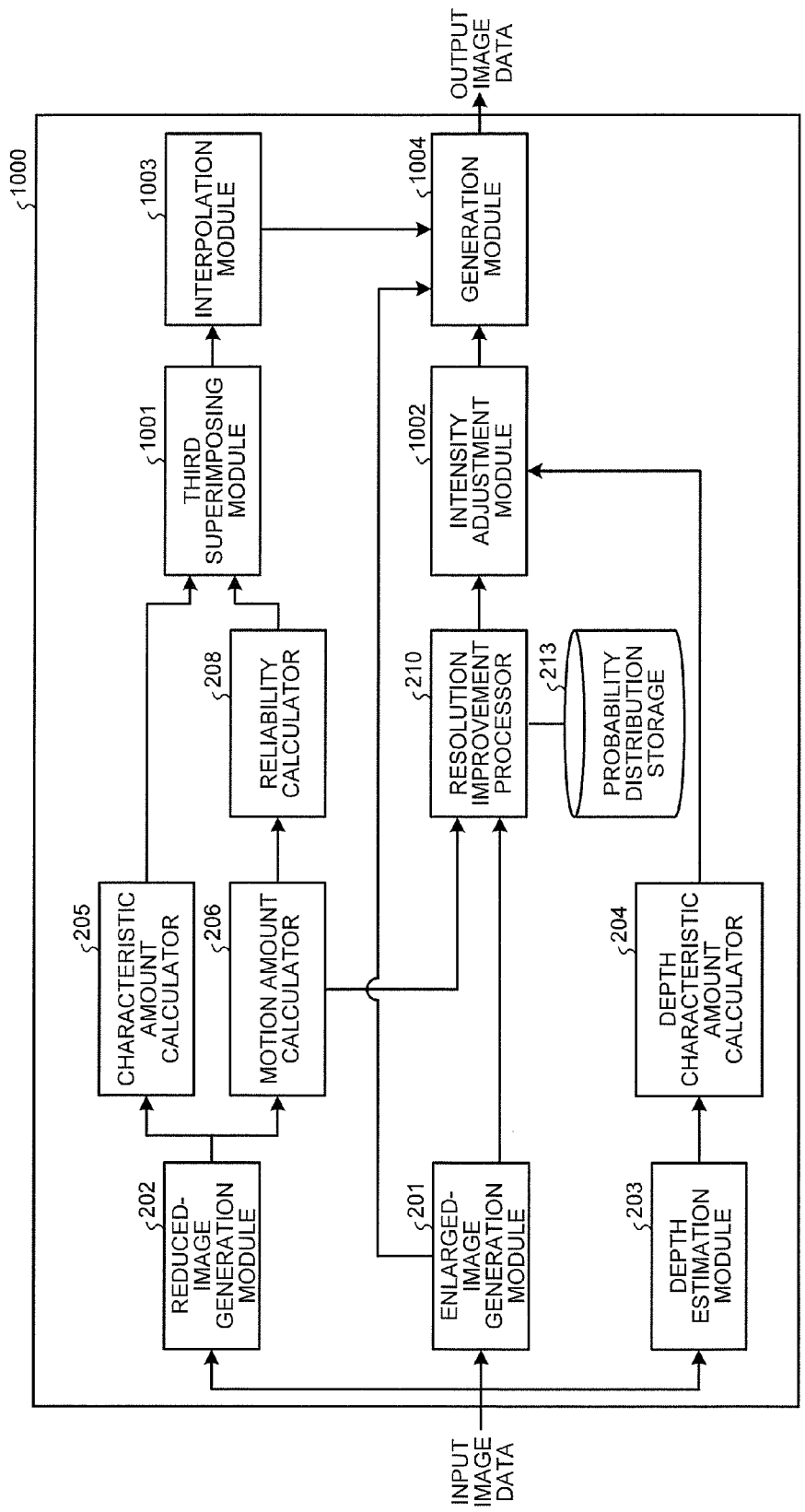
FIG. 10 is an exemplary functional structure diagram of an image processor in a second embodiment.

FIG. 10 is a functional structure diagram of an image processor 1000 according to the second embodiment. As illustrated in FIG. 10, the image processor 1000 comprises the following functional units relating to image processing of digital image signals: the enlarged-image generation module 201, the reduced-image generation module 202, the depth estimation module 203, the depth characteristic amount calculator 204, the characteristic amount calculator 205, the motion amount calculator 206, the reliability calculator 208, the resolution improvement processor 210, the probability distribution storage 213, a third superimposing module 1001, an intensity adjustment module 1002, an interpolation module 1003, and a generation module 1004. In the description below, common numerals are assigned to similar components to the first embodiment described above, and overlapping explanation thereof will be omitted.

The third superimposing module 1001 superimposes the characteristic amount in units of the first block (the 4×4 pixels) calculated by the characteristic amount calculator 205 onto the motion amount correspondence reliability in units of the second block (8×8 pixels) calculated by the reliability calculator 208 so that the corresponding areas match each other.

The interpolation module 1003 interpolates the characteristic amount to reduce the difference of the superimposition characteristic amounts between the adjacent blocks. The characteristic amount is the result of superimposition for each first block after being superimposed by the third superimposing module 1001. The interpolation method is the same as the first embodiment and overlapping explanation thereof will be omitted.

The intensity adjustment module 1002 adjusts the intensity (level) of the texture image data generated by the resolution improvement processor 210, according to the depth characteristic amount calculated by the depth characteristic amount calculator 204.

The generation module 1004 composes the texture image data in which the intensity has been adjusted by the intensity adjustment module 1002 with the intensity corresponding to the interpolation characteristic amount that has been interpolated by the interpolation module 1003 to generate the output image data.

The operations of the television apparatus 100 in the present embodiment will now be described. FIG. 11 is a flowchart of an image processing procedure performed by the image processor 1000.

When the input images in units of frames are input from the demodulation and decoding module 14 to the signal processor 15, the enlarged-image generation module 201 sequentially enlarges the pieces of input image data to a predetermined enlarged size to generate the pieces of enlarged image data (S1101). The reduced-image generation module 202 also sequentially reduces the pieces of input image data to a predetermined reduced size to generate the pieces of reduced image data (S1102).

In addition, the depth estimation module 203 sequentially generates the pieces of depth data from the pieces of input image data (S1103).

Then, the depth characteristic amount calculator 204 generates the depth characteristic amount, according to the depth data generated by the depth estimation module 203 (S1104).

The characteristic amount calculator 205 calculates the characteristic amount of the reduced image data in units of the first block from the reduced image data generated by the reduced-image generation module 202 (S1105).

The motion amount calculator 206 performs the motion vector search, thereby calculating the motion amount in units of a predetermined second block comprised in the reduced image data (S1106).

Then, the reliability calculator 208 calculates the motion amount correspondence reliability using the motion amount in units of the second block calculated by the motion amount calculator 206 (S1107).

Subsequently, the third superimposing module 1001 matches the correspondence between the first block and the second block, and then superimposes the characteristic amount calculated in units of the first block and the motion amount correspondence reliability calculated in units of the second block (S1108).

The interpolation module 1003 then performs interpolation on the result of superimposition (the superimposition characteristic amount) of S1108 (S1109).

The resolution improvement processor 210 generates the texture image data, according to the motion amount calculated by the motion amount calculator 206 (S1110).

The intensity adjustment module 1002 adjusts the intensity (level) of the texture image data generated by the resolution improvement processor 210, according to the depth characteristic amount calculated by the depth characteristic amount calculator 204 (S1111).

After that, the generation module 1004 composes the texture image data adjusted by the intensity adjustment module 1002 with the intensity corresponding to the interpolation characteristic amount interpolated by the interpolation module 1003 on the enlarged image data to generate the output image data (S1112).

As described above, according to the present embodiment, through the above-described processing, a high-quality image can be generated while occurrence factors of an artifact noise are reduced. Therefore, high image quality can be achieved. Although having a different structure, similar advantageous effects to those in the first embodiment can be achieved in the second embodiment.

In the television apparatus according to the above-described embodiments, the image data is output so that different intensity (level) of textures (high-frequency components) are added depending on the depth of the input image data. Therefore, the television apparatus can display three-dimensional image data (with a sense of depth), whereby high image quality can be achieved on the displayed image.

In the above-described embodiments, the superimposed value of the coefficient and the characteristic amount calculated from the motion amount (absolute value) rather than the motion vector is interpolated to achieve smoothing. By smoothing the value comprising the motion amount, control true to the motion amount regardless of the time direction can be achieved, whereby flickering is suppressed in the area of the high-frequency component such as a texture.

In related art, because the calculation amount for motion search or image analysis is generally large, if the frame size of the target image is full HD or 4K2K, real-time processing is difficult. By contrast, in the above-described embodiments, the reduced image data is used for processing or calculation of the characteristic amount and the motion amount, whereby the calculation amount for image adjustment can be reduced.

In the above-described embodiments, at least one of the characteristic amount, the depth characteristic amount, and the motion amount is calculated in units of the block. Accordingly, the difference between adjacent blocks to each other stands out, thus the block shape is highlighted therebetween and image quality may be deteriorated. In this respect, interpolation processing is performed in the above-described embodiments to smoothen the boundaries of the blocks, whereby image quality deterioration can be suppressed.

The high-frequency component such as a texture flicks quickly in the area in which motion amount is large, if highlighted, whereby the image quality as a moving image is deteriorated. Therefore, in the above-described embodiments, by reducing the highlight level in the area in which motion amount is large, the image quality of the high-frequency component can be improved.

While certain embodiments have been described, these embodiments have been presented by way of example only, and are not intended to limit the scope of the invention. The embodiments described above may be embodied in a variety of other forms; furthermore, various omissions, substitutions, changes, and additions may be made without departing from the spirit of the invention. The embodiments described above and their modifications are comprised in the scope and abstract of the invention, and also in the claims and their equivalent scope.

For example, in the above-described embodiments, the characteristic amount at each position of the processing target block is interpolated in units of the sub-blocks. However, the embodiment is not limited to this example, and the interpolation may be performed in units of pixels.

Furthermore, in the above-described embodiments, for the purpose of mitigating the load due to processing relating to the calculation of the characteristic amount or the motion amount, the reduced image data is generated from the input image data and the reduced image data is processed. However, the embodiment is not limited to this example, and the input image data or the enlarged image data may be processed.

The above-described embodiments are applied to the television apparatus 100, but the apparatus is not limited to this example. Examples of the apparatus may include an information processing apparatus such as a set-top box capable of receiving broadcast signals, a recording and reproducing apparatus, and a personal computer (PC).

The functional modules comprised in the signal processor 15 in the embodiments may have a hardware structure implemented through circuits such as application specific integrated circuits (ASIC). Alternatively, the functional modules may have a software structure implemented through collaboration of a processor such as a central processing unit (CPU) and a computer program stored in a predetermined recording medium.

If the functional modules are implemented with the software structure, their computer program may be provided in a manner installed in a recording medium (e.g., the ROM 122 and the HDD 27) comprised in the television apparatus 100 in advance. The computer program may also be provided in a manner recorded as an installable or executable file format on a computer-readable recording medium such as a flexible disk (FD) and the optical disc 26.

The recording medium is not limited to a medium independent from a computer or an embedded system, but comprises a recording medium storing or temporarily storing the computer program transmitted through a local area network (LAN) or the Internet, for example, and downloaded. The computer program may also be provided in a manner stored in a computer connected to a network such as the Internet so as to be downloaded through the network. Furthermore, the computer program may be provided or distributed over a network such as the Internet.

Moreover, the various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing apparatus comprising:
an enlarged-image generation module configured to generate enlarged image information that is enlarged with a predetermined magnification ratio from input image information;
a depth characteristic calculator configured to calculate, from the input image information, a depth characteristic amount indicating a change level of depth of field for each a plurality of areas comprised in the input image information;
a motion amount calculator configured to calculate a motion amount for each predetermined first block generated between the input image information and former input image information that is previously input before the input image information;
a high-frequency component image generation module configured to generate high-frequency component image data, based on an area of the enlarged image information corresponding to the first block, according to the motion amount for the first block calculated by the motion amount calculator; and
a generation module configured to compose a high-frequency component associated with the high-frequency component image data generated by the high-frequency component image generation module onto the enlarged image information, based on the depth characteristic amount calculated by the depth characteristic calculator to generate output image information.

2. The image processing apparatus of claim 1, wherein
the depth characteristic calculator is configured to calculate the depth characteristic amount indicating the level of depth of field from the input image information for each predetermined second block, and
the image processing apparatus further comprising:
a determination module configured to sequentially select processing target blocks to be processed out of a plurality of the second blocks and determine whether the depth characteristic amount of the processing target block is equal to or less than a predetermined threshold; and
an interpolation module configured to interpolate the depth characteristic amount at each position of the processing target block using an interpolation coefficient with reference to a positional relationship of the processing target block and a block adjacent to the processing target block if the determination module determines that the depth characteristic amount exceeds the threshold; wherein
the interpolation module is configured to change a condition relating to the positional relationship serving as a reference of the interpolation coefficient, depending on whether the depth characteristic amount of the adjacent block is equal to or less than the threshold.

3. The image processing apparatus of claim 2, further comprising:
a reduced-image generation module configured to generate reduced image information that is reduced with a predetermined reduction ratio from the input image information;
a characteristic amount calculator configured to calculate a characteristic amount indicating a characteristic of an image for each area of the reduced image information corresponding to the second block; and
a superimposing module configured to superimpose the characteristic amount calculated by the characteristic amount calculator and the depth characteristic amount for each second block calculated by the depth characteristic calculator, for each area corresponding to the second block; wherein
the determination module is configured to sequentially select the processing target blocks to be processed out of a plurality of the areas superimposed by the superimposing module and determine whether a result of superimposition by the superimposing module is equal to or less than the predetermined threshold, and
the interpolation module is configured to interpolate the characteristic amount that is superimposed at each position of the processing target block using the interpolation coefficient with reference to the positional relationship of the processing target block and the block adjacent to the processing target block if the determination module determines that the characteristic amount exceeds the threshold.

4. The image processing apparatus of claim 3, further comprising:
a reliability calculator configured to calculate reliability of the motion amount for each area corresponding to the second block, based on the motion amount calculated by the motion amount calculator, wherein
the superimposing module superimposes the characteristic amount calculated by the characteristic amount calculator, the depth characteristic amount calculated by the depth characteristic calculator for each second block, and the reliability of the motion amount calculated by the reliability calculator, for each area corresponding to the second block.

5. The image processing apparatus of claim 1, further comprising:
an adjustment module configured to adjust a level of the high-frequency component in the output image information comprising the high-frequency component associated with the high-frequency component image data generated by the high-frequency component image generation module, based on the depth characteristic amount calculated by the depth characteristic calculator, wherein
the generation module is configured to compose the output image information comprising the high-frequency component adjusted by the adjustment module, based on the motion amount, onto the enlarged image information to generate the output image information.

6. The image processing apparatus of claim 1, wherein the enlarged-image generation module, the depth characteristic calculator, the motion amount calculator, the high-frequency component image generation module, and the generation module are configured as circuits within an application specific integrated circuit.

7. An image processing method, comprising:
generating enlarged image information that is enlarged with a predetermined magnification ratio from input image information;
calculating, from the input image information, a depth characteristic amount indicating a change level of depth of field for each a plurality of areas comprised in the input image information;
calculating a motion amount for each predetermined first block generated between the input image information and former input image information that is previously input before the input image information;
generating a high-frequency component image, based on an area of the enlarged image information corresponding to the first block, according to the motion amount for the first block calculated at the calculating of the motion amount; and composing a high-frequency component calculated at the generating of the high-frequency component image onto the enlarged image information, based on the depth characteristic amount calculated to generate output image information.

8. The image processing method of claim 7, wherein the calculating of the depth characteristic amount comprises calculating the depth characteristic amount indicating the level of depth of field from the input image information for each predetermined second block.

9. The image processing method of claim 8 further comprising:

sequentially selecting processing target blocks to be processed out of a plurality of the second blocks and determining whether the depth characteristic amount of the processing target block is equal to or less than a predetermined threshold; and interpolating the depth characteristic amount at each position of the processing target block using an interpolation coefficient with reference to a positional relationship of the processing target block and a block adjacent to the processing target block if the determining determines that the depth characteristic amount exceeds the threshold, wherein the interpolating comprises changing a condition relating to the positional relationship serving as a reference of the interpolation coefficient, depending on whether the depth characteristic amount of the adjacent block is equal to or less than the threshold.

10. The image processing method of claim 9, further comprising:

generating reduced image information that is reduced with a predetermined reduction ratio from the input image information;

calculating a characteristic amount indicating a characteristic of an image for each area of the reduced image information corresponding to the second block; and superimposing the characteristic amount calculated at the calculating of the characteristic amount and the depth characteristic amount for each second block calculated at the calculating of the depth characteristic amount, for each area corresponding to the second block; wherein the selecting comprises sequentially selecting the processing target blocks to be processed out of a plurality of the areas superimposed at the superimposing, and the determining comprises determining whether a result of superimposition at the superimposing is equal to or less than the predetermined threshold, and the interpolating comprises interpolating the characteristic amount that is superimposed at each position of the processing target block using the interpolation coefficient with reference to the positional relationship of the processing target block and the block adjacent to the processing target block if the determining determines that the characteristic amount exceeds the threshold.

11. The image processing method of claim 10, further comprising:

calculating reliability of the motion amount for each area corresponding to the second block, based on the motion amount calculated at the calculating of the motion amount, wherein the superimposing comprises superimposing the characteristic amount calculated at the calculating of the characteristic amount, the depth characteristic amount calculated at the calculating of the depth characteristic amount for each second block, and the reliability of the motion amount calculated at the calculating of the motion amount, for each area corresponding to the second block.

12. The image processing method of claim 7, further comprising:

adjusting a level of the high-frequency component in the image information comprising the predetermined high-frequency component generated at the generating of the high-frequency component image, based on the depth characteristic amount calculated at the calculating of the depth characteristic amount, wherein the composing comprises composing the image information comprising the predetermined high-frequency component adjusted at the adjusting, based on the motion amount, onto the enlarged image information to generate the output image information.

13. An image processing apparatus comprising:

one or more hardware processors;

an enlarged-image generation module configured to generate enlarged image information that is enlarged with a predetermined magnification ratio from input image information;

a depth characteristic calculator configured to calculate, from the input image information, a depth characteristic amount indicating a change level of depth of field for each a plurality of areas comprised in the input image information;

a motion amount calculator configured to calculate a motion amount for each predetermined first block generated between the input image information and former input image information that is previously input before the input image information;

a high-frequency component image generation module configured to generate high-frequency component image data, based on an area of the enlarged image information corresponding to the first block, according to the motion amount for the first block calculated by the motion amount calculator; and a generation module configured to compose a high-frequency component associated with the high-frequency component image data generated by the high-frequency component image generation module onto the enlarged image information, based on the depth characteristic amount calculated by the depth characteristic calculator to generate output image information, wherein a process of at least one of the enlarged-image generation module, the depth characteristic calculator, the motion amount calculator, the high-frequency component image generation module, or the generation module is executed by operation of the one or more hardware processors.

14. The image processing apparatus of claim 13, wherein the depth characteristic calculator is configured to calculate the depth characteristic amount indicating the level of depth of field from the input image information for each predetermined second block.

15. The image processing apparatus of claim 14 further comprising:

a determination module that, when executed by the processor, is configured to sequentially select processing target blocks to be processed out of a plurality of the second blocks and determine whether the depth characteristic amount of the processing target block is equal to or less than a predetermined threshold; and an interpolation module that, when executed by the processor, is configured to interpolate the depth characteristic amount at each position of the processing target block using an interpolation coefficient with reference to a positional relationship of the processing target block and a block adjacent to the processing target block if the determination module determines that the depth characteristic amount exceeds the threshold, wherein the interpolation module is configured to change a condition relating to the positional relationship serving as a reference of the interpolation coefficient, depending on whether the depth characteristic amount of the adjacent block is equal to or less than the threshold.

16. The image processing apparatus of claim 15, further comprising:

a reduced-image generation module that, when executed by the processor, is configured to generate reduced image information that is reduced with a predetermined reduction ratio from the input image information;

a characteristic amount calculator that, when executed by the processor, is configured to calculate a characteristic amount indicating a characteristic of an image for each area of the reduced image information corresponding to the second block; and a superimposing module that, when executed by the processor, is configured to superimpose the characteristic amount calculated by the characteristic amount calculator and the depth characteristic amount for each second block calculated by the depth characteristic calculator, for each area corresponding to the second block, wherein the determination module is configured to sequentially select the processing target blocks to be processed out of a plurality of the areas superimposed by the superimposing module and determine whether a result of superimposition by the superimposing module is equal to or less than the predetermined threshold, and the interpolation module is configured to interpolate the characteristic amount that is superimposed at each position of the processing target block using the interpolation coefficient with reference to the positional relationship of the processing target block and the block adjacent to the processing target block if the determination module determines that the characteristic amount exceeds the threshold.

17. The image processing apparatus of claim 16, further comprising:

a reliability calculator configured to calculate reliability of the motion amount for each area corresponding to the second block, based on the motion amount calculated by the motion amount calculator, wherein the superimposing module superimposes the characteristic amount calculated by the characteristic amount calculator, the depth characteristic amount calculated by the depth characteristic calculator for each second block, and the reliability of the motion amount calculated by the reliability calculator, for each area corresponding to the second block.

18. The image processing apparatus of claim 15, further comprising:

an adjustment module that, when executed by the processor, is configured to adjust a level of the high-frequency component in the output image information comprising the high-frequency component associated with the high-frequency component image data generated by the high-frequency component image generation module, based on the depth characteristic amount calculated by the depth characteristic calculator, wherein the generation module is configured to compose the output image information comprising the high-frequency component adjusted by the adjustment module, based on the motion amount, onto the enlarged image information to generate the output image information.

* * * * *